(12) United States Patent
Ianello

(10) Patent No.: US 6,561,473 B1
(45) Date of Patent: May 13, 2003

(54) UNIVERSAL PIPE MOUNTING CLAMP AND ASSEMBLY

(75) Inventor: Daniel Ianello, Plymouth, IN (US)

(73) Assignee: PiRod, Inc., Plymouth, IN (US)

( * ) Notice: Subject to any disclaimer, the term of this patent is extended or adjusted under 35 U.S.C. 154(b) by 0 days.

(21) Appl. No.: 09/821,899

(22) Filed: Mar. 30, 2001

(51) Int. Cl.⁷ .............................................. A47B 96/06
(52) U.S. Cl. .................... 248/219.4; 248/230; 248/214; 403/384; 52/719; 52/713
(58) Field of Search .............................. 248/219.4, 230, 248/214, 540, 539; 403/384, 385, 396, 400, 398; 52/719, 713

(56) References Cited

U.S. PATENT DOCUMENTS

| | | | | |
|---|---|---|---|---|
| 1,062,227 A | * | 5/1913 | Daniels | 248/70 |
| 1,384,520 A | * | 7/1921 | Ditson | 248/70 |
| 2,679,413 A | * | 5/1954 | Johnson | 248/70 |
| 2,894,773 A | * | 7/1959 | Noe | 248/70 |
| 3,006,669 A | * | 10/1961 | Novales | 248/70 |
| 3,414,219 A | | 12/1968 | Siegel | |
| 3,591,163 A | * | 7/1971 | Anderson | 267/52 |
| 4,167,033 A | * | 9/1979 | Fletcher | 362/396 |
| 4,320,882 A | * | 3/1982 | Bachle | 248/70 |
| 4,500,064 A | | 2/1985 | Calabro | |
| 4,860,985 A | | 8/1989 | Olson et al. | |
| 4,899,963 A | | 2/1990 | Murphy | |
| 4,993,670 A | | 2/1991 | Tesar | |
| 5,274,888 A | | 1/1994 | Payne | |
| 5,533,304 A | | 7/1996 | Noble | |
| 5,787,673 A | | 8/1998 | Noble | |
| 5,867,132 A | | 2/1999 | Blasing et al. | |
| 5,954,305 A | | 9/1999 | Calabro | |
| 6,043,795 A | | 3/2000 | Strieffler et al. | |
| 6,106,189 A | * | 8/2000 | Seale | 403/398 |
| 6,262,691 B1 | * | 7/2001 | Austin et al. | |

* cited by examiner

Primary Examiner—Kimberly Wood
(74) Attorney, Agent, or Firm—Baker & Daniels (57) ABSTRACT

A pipe mounting clamp assembly for mounting a pair of pipes to one another. The assembly also includes a bracket, and at least one pair of fasteners. The bracket has a base, and at least one saddle member attached to and extending from a surface of the base. In the preferred embodiment, the saddle member has at least two different radial support surfaces for supporting pipes of different diameters. The support surfaces are knurled or ridged to provide a good grip of a pipe supported thereon. In one embodiment of the invention, the bracket has two saddle members, two pairs of elongated slots, and two pairs of apertures in the base. One of the fasteners is secured to the base through the apertures and the other fastener is secured to the base through the elongated slots. The major portion of one fastener extends above the surface of the base from which the saddle member extends, and a major portion of the other fastener extends from a surface of the base opposite the surface supporting the saddle members.

18 Claims, 6 Drawing Sheets

UNIVERSAL PIPE MOUNTING CLAMP AND ASSEMBLY

BACKGROUND OF THE INVENTION

The subject invention relates to a bracket for use in securing intersecting pipes to one another, and in particular, to a versatile unitary bracket for use with fasteners for providing a secure fit between intersecting pipes having a wide range of diameters.

In the construction of antennas or antenna platforms, it is often necessary to secure pipes together that intersect one another, and in particular, intersect orthogonally. It has been known to provide a bracket and clamps or fastening mechanisms such as a U-bolt to secure a pipe to a mount, or to secure other items to a pipe or antenna member.

One such bracket and clamp is shown in U.S. Pat. No. 5,274,888 to W. Payne, incorporated herein by reference.. The clamp in Payne includes a pair of complementary adjustable sliding portions. The sliding portion define a saddle portion to provide a seat for a pipe. The clamp portions are slidable relative to one another so that the width of the saddle may be varied to accommodate pipes of different diameters. The saddle portion includes arcuate surfaces and a single sharp tooth-like projection on each arcuate surface for biting into the surface of the pole to be clamped. This clamp has several disadvantages including complexity of assembly because the saddle portions are split from one another, there are no gripping portions at the base of the saddle, and it is not suitable for and provides no teaching for clamping intersecting pipes to one another.

Another pipe clamp bracket assembly is shown in U.S. Pat. No. 4,993,670 to R. Tesar, incorporated herein by reference. The bracket assembly is designed to secure gas riser pipes to a support member. The bracket assembly in Tesar includes U-shaped fasteners and a retainer having a scalloped cross-section that provides at least two differently radiused sets of support surfaces for supporting pipes of different diameters. The bracket assembly in Tesar is designed for supporting the gas risers to a parallel support member and is not usable for, nor does it teach using the assembly for, securing pipes together that intersect at an angle. Furthermore, the support surfaces of the retainer do not include any gripping feature to prevent the retainer from slipping on the pipe, and opposing the retainer on the opposite side of the pipe are two L-shaped members which have a flat surface bearing against the pipe. As such, the assembly requires three separate bracket pieces not including the fasteners increasing the complexity of assembly.

A support saddle for tethering pipes, cables, wires, or conduit to a support surface is disclosed in U.S. Pat. No. 4,899,963 to P. Murphy, incorporated herein by reference. The saddle includes imbrications to help grip and secure the pipe in a trough of the saddle. Also, an embodiment of the saddle is shown having two troughs wherein intersecting pipes may be tethered together. There are several disadvantages associated with the saddle, one of which is that the saddle for tethering intersecting pipes together is relatively large and bulky and awkward with which to work. The device is also designed to be used with a flexible band type clamp (CL in FIG. 2) and is not designed or suitable, especially in the double trough embodiments, for utilizing a more sturdy U type clamp.

As such, it is an object of this invention to provide a universal bracket suitable for use in clamping intersecting pipes of varying diameters to one another. It is also an object of the invention to provide a clamping assembly that is easy to install requiring a minimum of parts, yet will provide a secure and rigid interconnection.

Another object of the invention is to provide a bracket for the assembly that is easy to handle. Other objects of the invention will become apparent when reading the following detailed description of the invention and the attached claims.

SUMMARY OF THE INVENTION

It is a feature of the invention to provide a pipe mounting bracket for mounting a pair of pipes to one another having a base, and at least one saddle member attached to and extending from a surface of the base. In the preferred embodiment, the saddle member has at least two different radial support surfaces for supporting pipes of different diameters. The support surfaces are knurled or ridged to provide a good grip of a pipe supported thereon.

It is another feature of the invention that the base has at least one pair of apertures. One of each of the apertures are located adjacent opposite ends of the saddle member, and in any pair of elongated slots, the slots are located on opposite sides of a midline through the bracket.

In one embodiment of the invention, the bracket has two saddle members, two pairs of elongated slots, and two pairs of apertures in the base. One pair of the elongated slots is located between one of said saddle members and a side edge of the base, and the other pair of elongated slots is located between the other saddle member and the opposite side edge of the base. One of each of the apertures is located adjacent a different corner of the base.

It is also an aspect of the invention to include a third pair of apertures through the base between the saddle members. In the embodiments shown, the saddle members are generally perpendicular to the base.

In one embodiment of the invention, the bracket is a component in a pipe mounting clamp assembly for mounting a pair of pipes to one another. The assembly also includes a pair of fasteners, wherein one of the fasteners is secured to the base through the apertures and the other fastener is secured to the base through the elongated slots.

It is another aspect of the assembly that the major portion of one fastener extends above the surface of the base from which the saddle member extends, and a major portion of the other fastener extends from a surface of the base opposite the surface supporting the saddle members.

In a preferred embodiment of the pipe mounting clamp assembly, both of the fasteners include a U-bolt secured by nuts.

In yet another aspect of the invention, the assembly includes a second pair of U-bolts and a different U-bolt extends through each of either one of the pairs of elongated slots or one of the pairs of apertures.

Furthermore, it is a feature of the invention that the bracket is configured to receive a pipe on the substantially flat back surface of the base transversely to the midline. The bracket is also configured to receive an intersecting pipe to be seated in a radiused surface of the saddle member and generally parallel to the midline.

Other aspects of the invention will become apparent upon reading the following detailed description and claims.

DETAILED DESCRIPTION OF THE PREFERRED EMBODIMENT

Figure 1:
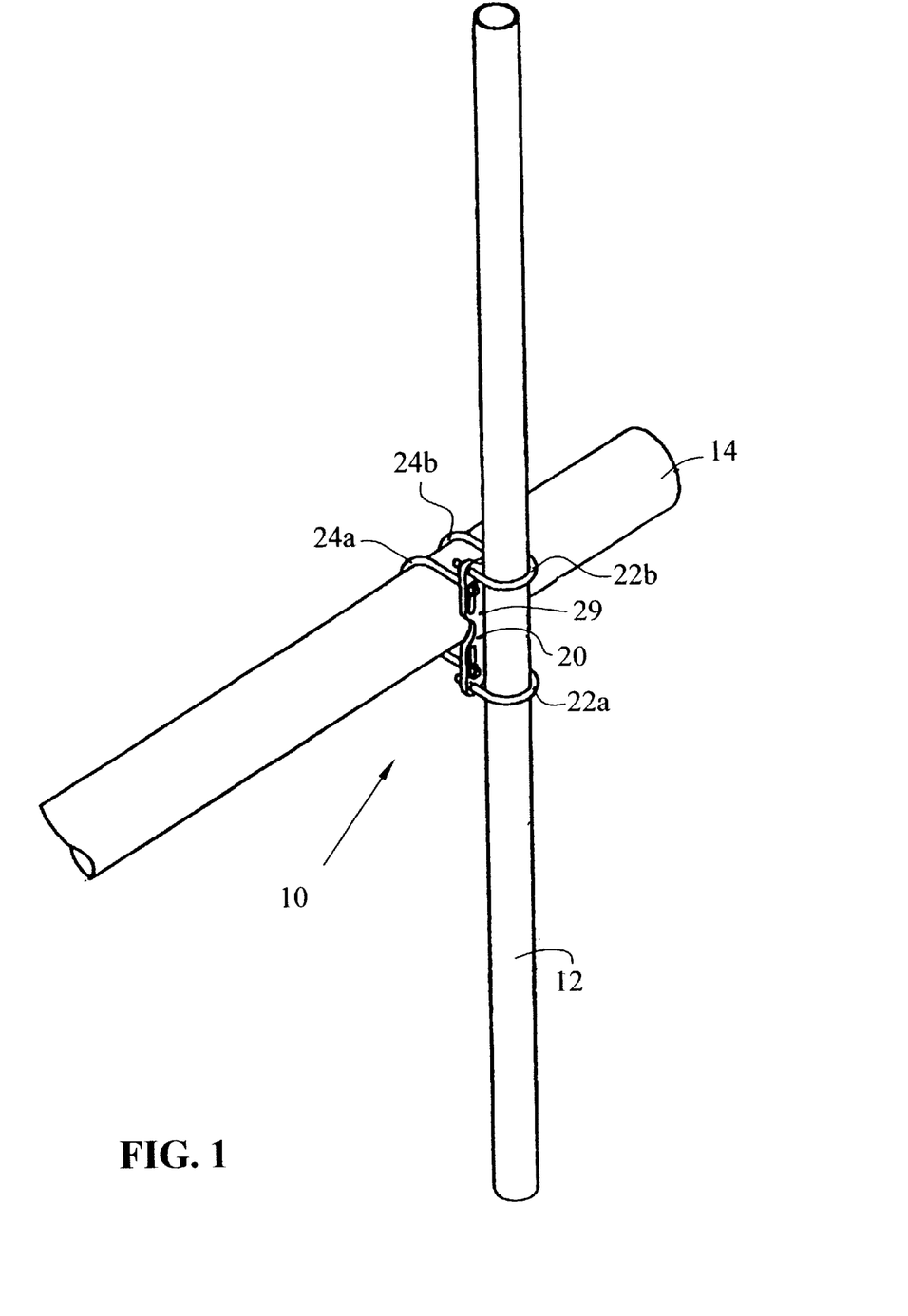
FIG. 1 is a perspective view of a pipe mounting clamp assembly of the present invention shown interconnecting a pair of intersecting pipes.

A pipe mounting clamp assembly is shown generally as 10 in FIG. 1. Assembly 10 is shown interconnecting a vertical mounting pipe 12 such as an antenna or mast to a horizontal mounting pipe 14 such as an antenna, platform or other mount. The clamp assembly 10 includes a bracket 20 and two pairs of U-bolt fasteners 22a, 22b and 24a, 24b. U-bolt fasteners 22a, 22b fasten or secure vertical mounting pipe to bracket 20, and U-bolt fasteners 24a, 24b fasten or secure horizontal mounting pipe 14 to bracket 20.

Figure 2:
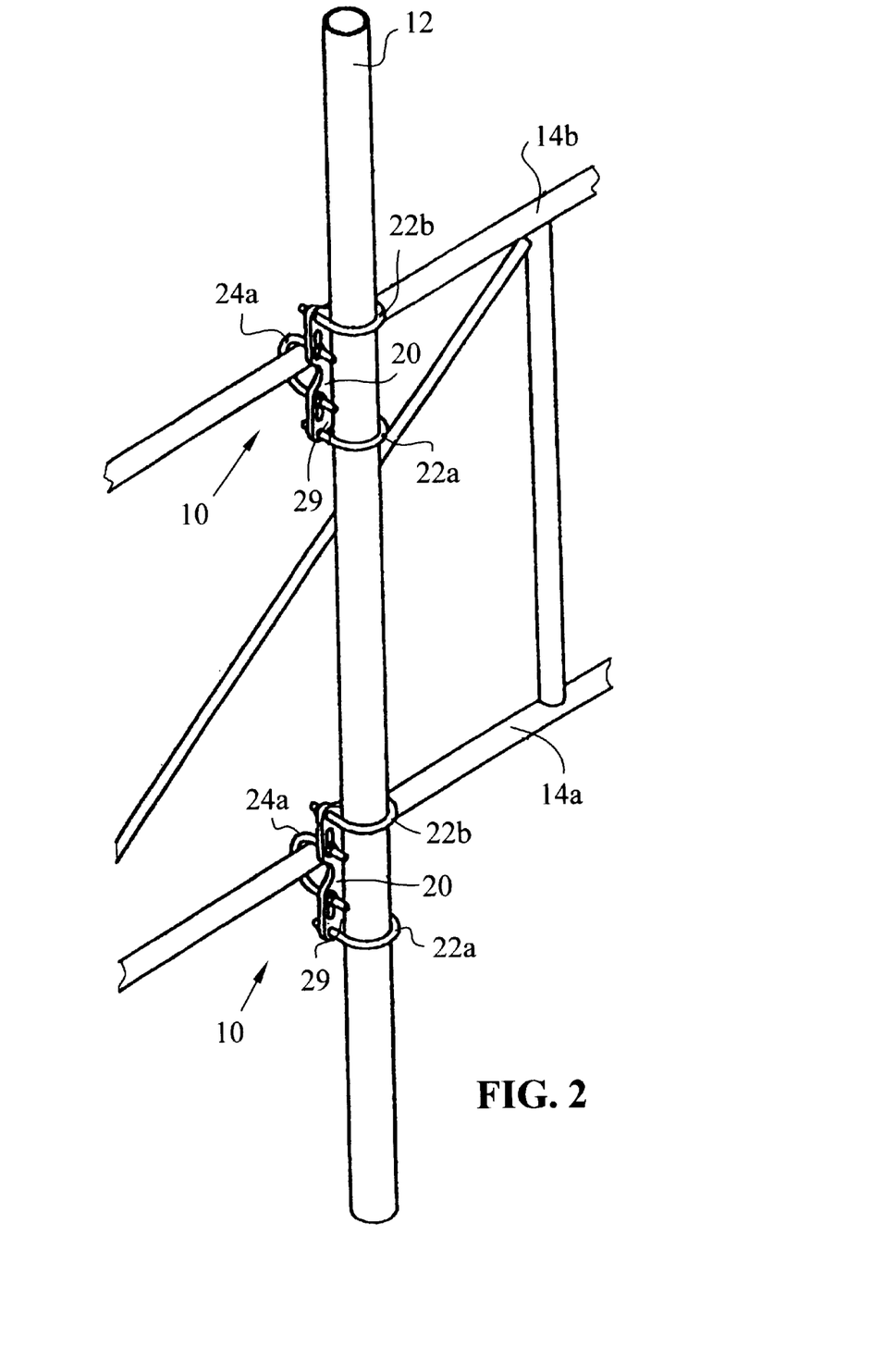
FIG. 2 is a perspective view of a pair of the pipe mounting clamp assemblies interconnecting two different horizontal pipes to a single vertical mounting pipe.

In FIG. 2, a pair of pipe mounting clamp assemblies 10 are shown in a dual level application wherein the assemblies are used to secure a pair of horizontal mounting pipes 14a, 14b that form a part of a structural frame work to the single vertical mounting pipe 12.

Figure 3:
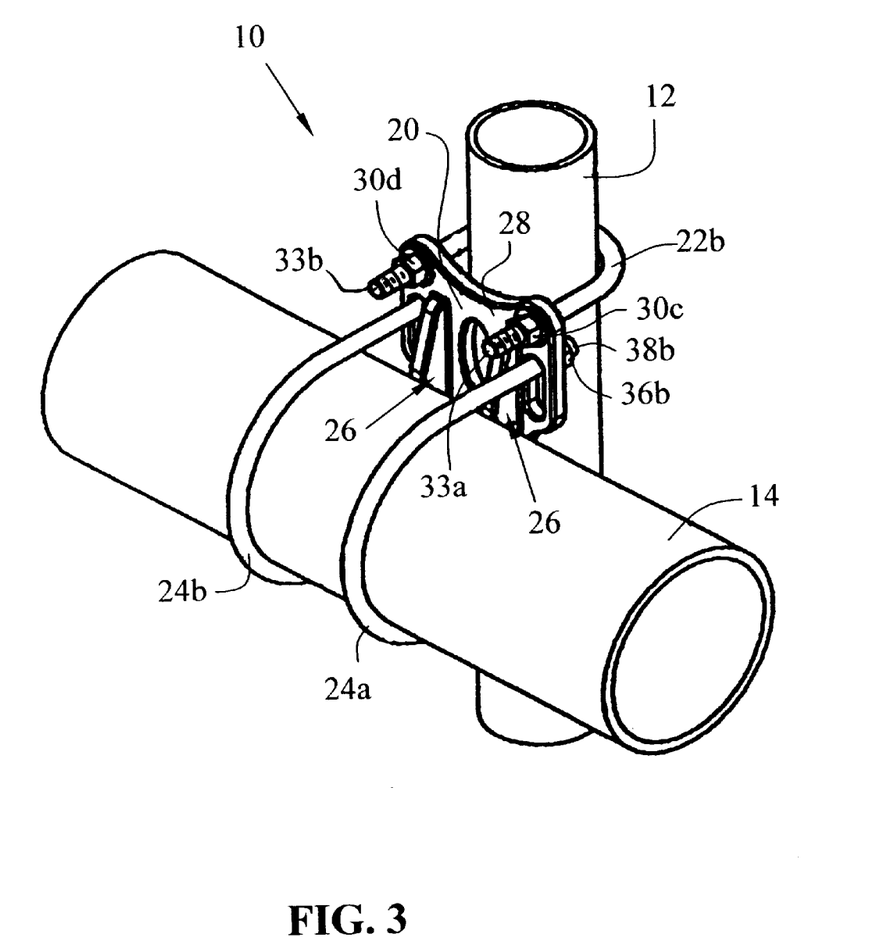
FIG. 3 is a perspective view of the pipe mounting clamp assembly shown from an opposite side from FIG. 1 wherein saddle members of a bracket of the assembly are visible.
Figure 4:
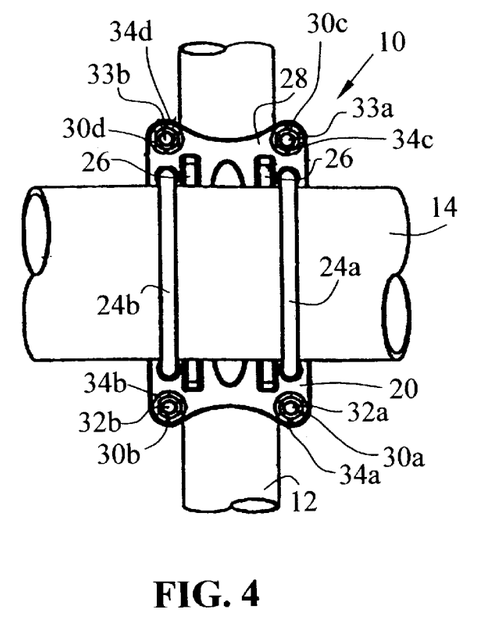
FIG. 4 is a front view of the pipe mounting clamp assembly taken from the side of the bracket having the saddle members.
Figure 5:
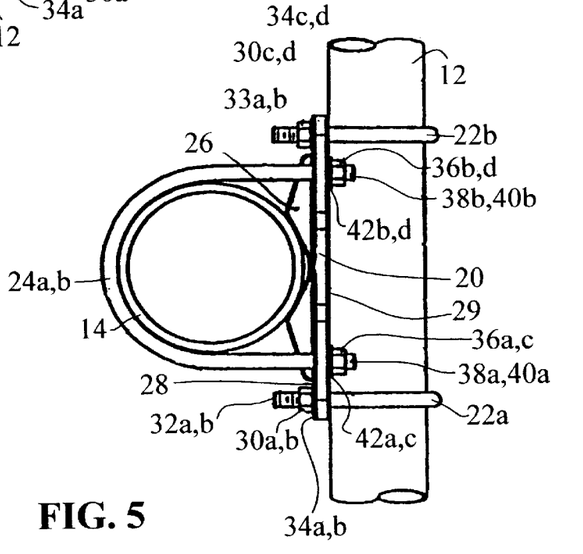
FIG. 5 is a side view of the pipe mounting clamp assembly showing the intersecting pipes secured together.
Figure 6:
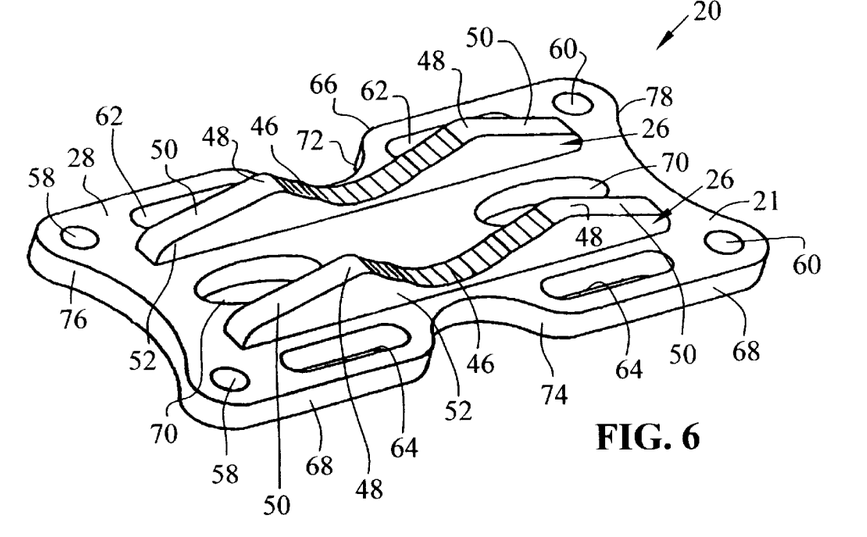
FIG. 6 is a perspective view of the bracket of the present invention shown from the side having the saddle members.
Figure 7:
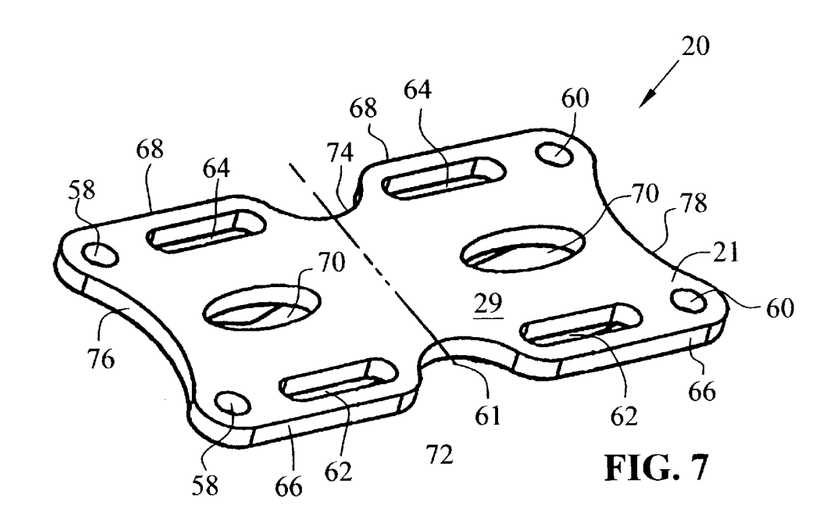
FIG. 7 is a perspective view of the bracket from the opposite side shown in FIG. 6.

Now referring to FIGS. 3–5, it can be seen that bracket 20 includes a base 21, a pair of saddle members generally indicated as 26 extending from a front surface 28 of the base. Opposite the front surface 28 is a rear surface 29. It can also be seen that securing U-bolt fasteners 22a, 22b to bracket 20 are nuts 30a,b and 30c,d, respectively. The nuts 30a, 30b are screwed onto threaded ends 32a, 32b, respectively, of U-bolt fastener 22a. Likewise, the nuts 30c, 30d are screwed onto threaded ends 33a, 33b, respectively, of the U-bolt fastener 22b. Washers 34a, 34b may be placed between nuts 30a, 30b, respectively, and bracket 20 and washers 34c, 34d may be placed between nuts 30c, 30d, respectively, in the bracket.

Similar to U-bolt fasteners 22a, 22b, U-bolt fasteners 24a are secured to said bracket 20 by nuts 36a,b and 36c,d, respectively. The nuts 36a,b are screwed onto threaded ends 38a,b, respectively, of U-bolt 24a, and nuts 36c,d are screwed onto threaded ends 40a,b, respectively of U-bolt fastener 24b. As with nuts 30a–d, washers 42a–d may be placed between nuts 36a–d, respectively, and bracket 20.

In FIGS. 6–10, bracket 20 is shown apart from the assembly. In the embodiment shown, the bracket has two saddle members 26 extending from the front surface 28 of bracket 20. Each saddle member has a concave seating surface 46 that is knurled or ridged in order to firmly secure the pipe to be seated thereon. To either side of seating surface 46 are apexes 48 and inclined surfaces 50, which slope down towards the front surface 28. Saddle members 26 also have generally parallel sides 52, which extend generally perpendicular from front surface 28.

Figures 8, 9, 10:
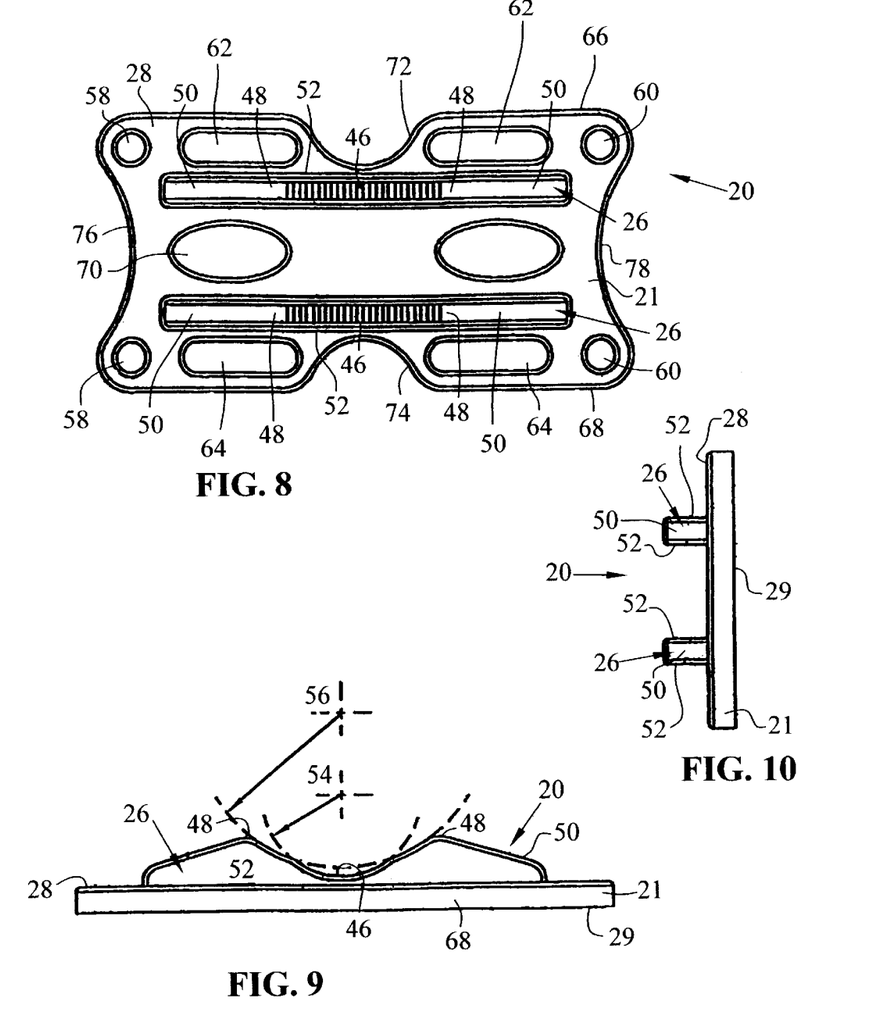
FIG. 8 is a top view of the bracket of the side having the saddle members.
FIG. 9 is a side view of the bracket showing multiple radii and support surfaces of the saddle members.
FIG. 10 is an end view of the bracket.

In the embodiment shown, seating surfaces 46 of saddle members 26 are formed on at least two radii. The central portion of seating surfaces 46 is formed along the first radius 54 as shown in FIG. 9. The portions of knurled seating surfaces 46, which are away from the center and closer to apexes 48, are formed along a second radius 56. In the embodiment shown, first radius 54 is smaller than second radius 56 to accommodate pipes of varying diameter as will be explained more fully below.

Bracket 20 also includes two pairs of circular apertures 58, 60 extending through base 21 such that one aperture is positioned adjacent each corner of the generally rectangular shaped base. Bracket 20 also includes a midline 61 (FIG. 7) and two pairs of elongated slots 62, 64 extending through base 21. The elongated slots 62 are located between a saddle member 26 and a side edge 66 of base 21. Furthermore, elongated slots 62 are located one each on opposite sides of midline 61 between one of the circular apertures 58 and one of the circular apertures 60. Similarly, the elongated slots 64 are located one each on opposite sides of midline 61 and between a saddle member 26 and a side edge 68 opposite of the side edge 66. Elongated slots 64 are also located between the other circular aperture 58 and other circular aperture 60. The base 21 of bracket 20 also includes a pair of elliptical apertures 70 located between the saddle members 26.

The side edges 66, 68 each include a concaved or curved-in portion 72, 74, respectively. In addition, the base 21 includes end edges 76, 78, which also have a gently curved inward or concave configuration.

Having identified the major component parts of the pipe mounting clamp assembly 10 and the elements of the bracket 20, the assembly of the unit as used for connecting intersecting pipes will now be discussed in further detail.

Assembly 10 is fit together by placing the rear surface 29 of the bracket 20 against the outside diameter of a pipe to be connected. The pipe against the rear surface 29 is aligned perpendicular to the midline 61. In the embodiment shown, vertical mounting pipe 12 is then placed against rear surface 29. Pipe 12 is secured to bracket 20 by means of U-bolt fasteners 22a, 22b, which are extended through circular apertures 58, 60, respectively, and secured with nuts 30a,b and 30c,d, respectively. As previously stated, washers 34a–d may be placed over threaded ends 32a,b and 33a,b prior to threading the nuts thereon and tightening the nuts and/or washers against the front surface 28 of the bracket 20.

Intersecting horizontal pipe 14 is placed into seating surfaces 46 of saddle members 26 and aligned along midline 61. Pipe 14 is then secured to bracket 20 using U-bolt fasteners 24a, 24b so that one of each of the ends 38a,b of fastener extends through one of the elongated slots 64, and one each of the ends 48a,b extends through a different elongated slot 62 in base 21. Pipe 14 is secured by tightening nuts 36a–d and/or washers 42a–d against the rear surface 29, which are fitted on respective ends of the U-bolt fasteners. It should become apparent to one skilled in the art that the configuration of the bracket is such that knurled seating surface 46 will readily accept pipes of varying diameter. Pipes of a smaller diameter will seat in the portion of seating surface 46 coinciding with the first radius 54, while pipes of a larger diameter will seat against the portions of knurled seating surface 46 corresponding to the second radius 56. Furthermore, the fact that the slots 62, 64 are elongated allow the slots to accept U-bolt fasteners of varying size so that the radius of U-bolt fasteners 24a, 24b may be matched according to the external diameter of pipe 14.

Elliptical apertures 70 in base 21 are not intended to be used for any attachments in the embodiment shown; rather, they serve as a means of reducing the weight of the bracket without impairing the structural integrity thereof. Obviously, in other embodiments or utilizations of the bracket, the elliptical apertures 70 could be used to help secure a pipe or other attachment to the bracket.

Concave portions 72, 74 also assist in weight reduction and provide a good gripping point for grasping the bracket during assembly. Likewise, the inwardly curved end edges 76, 78 also reduce weight and help provide a gripping point for use in assembling the unit.

While the invention has been taught with specific reference to the above embodiment, someone skilled in the art will recognize that changes can be made in form and detail without departing from the spirit and scope of the invention. For instance, although the embodiment shown utilizes two saddles, a bracket may be made with one larger saddle or more than two. Likewise, a single radius may be used for the seating surface of the saddle or more than two radii may be used to further increases the range of pipe diameters that may be held upon the bracket. Also, the shapes of all the slots and apertures may be interchanged with one another, varied in location upon the base, or other shapes may be used. Additional apertures may also be provided if it is desired to secure more than two fasteners around each pipe. Furthermore, any well-known fastening device may be substituted for the U shaped fasteners shown. It would also be possible to eliminate the concave gripping portions of the side edges or to configure the side edges in another shape that is easy for grasping. Therefore, the described embodiments are to be considered in all respects only as illustrative and not restrictive. The scope of the invention is, therefore indicated by the appended claims rather than by the description.

What is claimed is:

1. A pipe mounting bracket for mounting a pair of pipes to one another comprising a base, and at least two saddle members attached to and extending from a surface of said base, said saddle members having seating surfaces defined by at least two radii for supporting pipes of different diameters, said seating surfaces being knurled to provide a better grip of a pipe to be supported thereon, said base including at last two pairs of apertures therethrough, each of said apertures located adjacent a different corner of said base, and at least two pairs of elongated slots through said base, at least two of said slots being on opposite sides of a midline through said saddle members, and said slots located between said saddle members and side edges of said base.

2. The pipe mounting bracket as set forth in claim 1, comprising two saddle members and two pairs of elongated slots in said base, one pair of elongated slots located between one of said saddle members and a side edge of said base, and the other pair of elongated slots located between said other saddle member and the opposite side edge of said base.

3. The pipe mounting bracket as set forth in claim 1, comprising two pairs of apertures and two pairs of elongated slots.

4. The pipe mounting bracket as set forth in claim 3, comprising two saddle members.

5. The pipe mounting bracket as set forth in claim 4, further comprising a third pair of apertures through said base between said saddle members.

6. The pipe mounting bracket as set forth in claim 1, wherein the base includes a side gripping profile for ease and handling said bracket.

7. The pipe mounting bracket as set forth in claim 6, wherein said base also includes an end gripping profile for ease and handling said bracket.

8. A pipe mounting bracket for mounting a pair of pipes to one another comprising a base and at least two saddle members attached to and extending from a surface of said base, said base including at least one pair of apertures extending therethrough on opposite sides of a midline of said saddle members, and a pair of elongated slots extending through said base, said slots on opposite sides from each other of said midline of said saddle members, said saddle members having a knurled seating surface, said base including a curved concave gripping profile on at least one of either ends or sides thereof, each aperture being located adjacent a different corner of said base, and said pair of slots being located between the saddle members and a side edge of the bracket.

9. The pipe mounting bracket as set forth in claim 8, further including at least one aperture located in said base between said saddle members.

10. The pipe mounting bracket as set forth in claim 9, wherein the seating surface of the saddle members are defined by at least two radii, and the saddle members include an apex on either side of said seating surface and side walls extending generally perpendicular to said base.

11. A pipe mounting clamp assembly for mounting a pair of pipes to one another comprising a pipe mounting bracket having a base and at least one saddle member attached to and extending from a surface of said base, said base having at least one pair of apertures extending therethrough, said apertures on opposite sides of a midline of said saddle member, and at least one pair of elongated slots, said slots being on opposite sides from each other of said midline of said saddle member, and a pair of fasteners for securing the pipes to the clamp assembly, one of said fasteners for securing one of the pipes and being attached to said base through said apertures, and the other fastener for securing the other pipe and being attached to said base through said elongated slots.

12. The pipe mounting clamp assembly as set forth in claim 11, wherein the major portion of said other fastener extends above said surface of said base from which said saddle member extends, and a major portion of said one fastener extends above another surface of said base opposite the surface supporting said saddle member.

13. The pipe mounting clamp assembly as set forth in claim 12, wherein both of said fasteners include a U-bolt secured by nuts.

14. The pipe mounting clamp assembly as set forth in claim 11, wherein the bracket is configured to receive a pipe transversely to the midline on the back surface of the base, said back surface being substantially flat, and to receive an intersecting pipe generally parallel to the midline and seated in a radiused surface of the saddle member.

15. The pipe mounting clamp assembly as set forth in claim 11, wherein said saddle member is integrally attached to said base.

16. A pipe mounting clamp assembly for mounting a pair of pipes to one another comprising a pipe mounting bracket having a base and at least one saddle member attached to and extending from a surface of said base, said base having two pairs of apertures extending therethrough, each pair of apertures being on opposite sides of a midline of said saddle member, and two pairs of elongated slots, said pairs of said slots being on opposite sides from each other of said midline of said saddle member; and at least four fasteners, each of said fasteners including a U-bolt secured by nuts, one of said fasteners secured to said base through said apertures and another fastener secured to said base through said elongated slots, wherein a major portion of said another fastener extends above said surface of said base from which said saddle member extends, and a major portion of said one fastener extends above another surface of said base opposite the surface supporting said saddle member.

17. The pipe mounting clamp assembly as set forth in claim 16, wherein the base has two saddle members and one pair of elongated slots is positioned between one of the saddle members and an edge of the base and the other pair of elongated slots is positioned between the other saddle member and an opposite edge of the base.

18. The pipe mounting clamp assembly as set forth in claim 17, wherein said saddle members have at least two different radial support -surfaces for supporting pipes of different diameters.

\* \* \* \* \*